Figure 4:
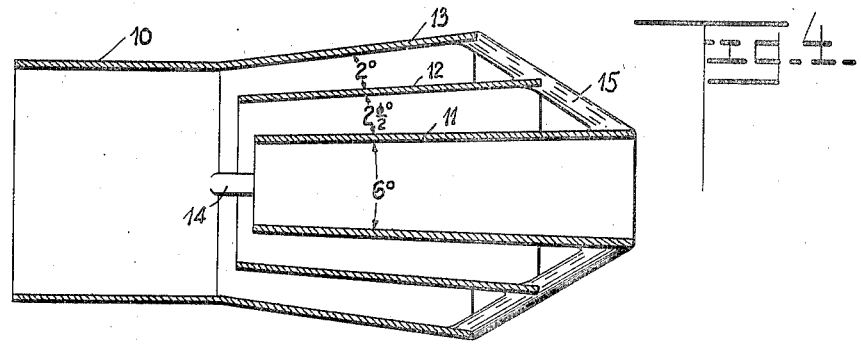

Oct. 30, 1934.　　　　F. J. KURTH　　　　1,978,678
FLAME EXTINGUISHER
Filed July 1, 1933　　2 Sheets-Sheet 1
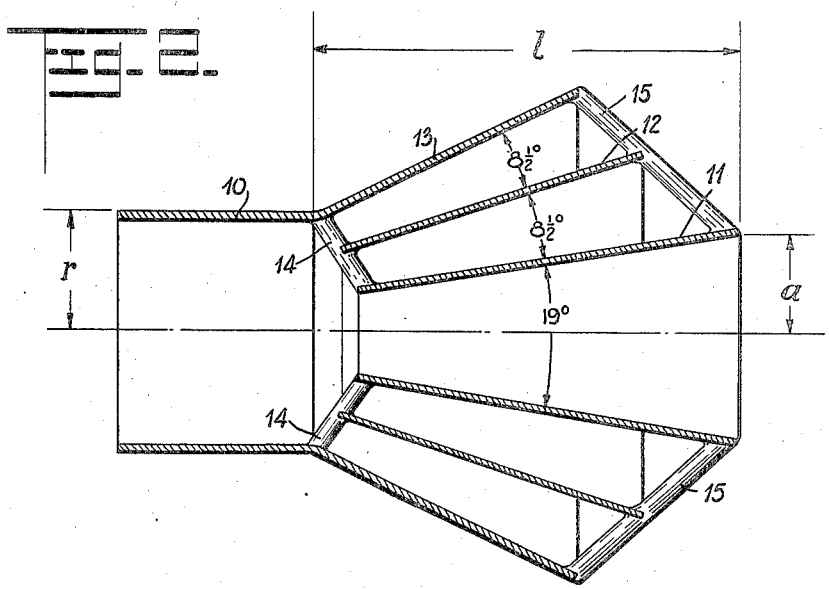
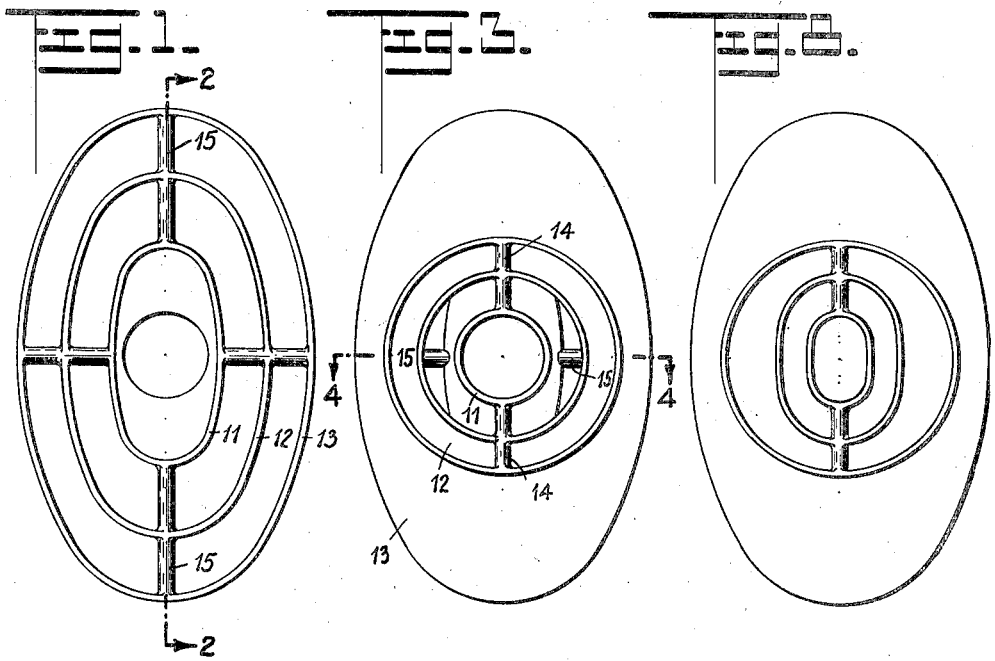
INVENTOR.
FRANZ J. KURTH.
BY
ATTORNEY.

Oct. 30, 1934.  F. J. KURTH  1,978,678
FLAME EXTINGUISHER
Filed July 1, 1933  2 Sheets-Sheet 2

INVENTOR.
FRANZ J. KURTH.
BY
his ATTORNEY.

Patented Oct. 30, 1934

1,978,678

UNITED STATES PATENT OFFICE 1,978,678

FLAME EXTINGUISHER

Franz J. Kurth, Cologne-Dellbruck, Germany

Application July 1, 1933, Serial No. 678,735
In Great Britain May 4, 1933

13 Claims. (Cl. 123—198)

My invention consists in a device designed to extinguish flame issuing from a pipe or conduit through which inflammatory gases or flames are conducted, as for instance, flames issuing from the exhaust pipe of an internal combustion engine. Such a device is especially adapted for use in connection with aircraft.

When an aircraft is in flight, flames will frequently issue from the exhaust of the engine, which, as will be readily appreciated, is very undesirable, especially in military aircraft, because apart from the risk of the aircraft catching fire, the flames will reveal the position of the aircraft during night flying. One of the objects of the present invention is to provide a means so designed that without in any substantial degree adding to the weight of the aircraft, or the drag thereof during flight, it will extinguish the flames as the gases are being exhausted.

This object is successfully accomplished by the flame-extinguishing device embodying my invention, which comprises a plurality of outwardly flaring hollow truncated elements or members, disposed in spaced relationship so as to provide a plurality of flaring passages therebetween. The members may be either nested one within the other, or they are disposed in front of each other with their smaller ends facing the inner end of the device. Toward the outer end of the device, the members are gradually flattened in cross-section. Such a flame-extinguisher having a considerable flame extinguishing capacity per unit of length can be made of comparatively small weight for a given flame-extinguishing capacity.

According to the invention, this great flame extinguishing capacity is obtained by the divergence of the walls of the innermost member being made much greater than the divergence of the annular spaces surrounding said innermost member.

According to a feature of the invention, the hollow flaring members may have a cross-section of circular shape at their inner end, i. e. the end facing the inner end of the device, being gradually flattened in cross-section to a cross-section of elliptical shape toward their outer ends.

This elliptical formation of the outer ends of the truncated flaring members is of very great practical value, because it reduces the drag of the extinguisher when used on aircraft. On the other hand, however, the ellipse must not be too flat in shape for the reason that the flow of gases through the device in that case would be interfered with, and a proper flame quenching effect would no longer be obtained. In practice, I have found that the best results are obtained when the axial ratio of the ellipse, that is to say, the ratio of the major to the minor axis, is about 1.7. If this axial ratio is diminished, the drag of the device increases, whereas, if the axial ratio is substantially increased, the flame quenching capacity of the device is reduced.

By the divergence of a hollow member of elliptical or partly elliptical cross-section, I mean the divergence of the circular member having the same perimeter at its outlet and inlet ends, the divergence of this circular member being, of course, double the angle included between the axis and the generatrix of the member. In the same way, the divergence of the walls of the annular spaces between members of elliptical cross-section is to be understood as meaning the divergence of the walls of the annular spaces between the equivalent members of circular cross-section, that is to say, the difference in the angles included between the axis of the device and the generatrices of the members bounding the annular spaces in question.

In view of the desirability of weight reduction, the length of the device, will, of course, be made as short as is consistent with proper extinction of the flames in the exhaust gases. In the case of an extinguisher, for instance, comprising three truncated hollow members, satisfactory results are obtained, if the length of the member of the extinguisher exceeds the radius of the exhaust pipe about 3 to 3½ times.

Figure 5:
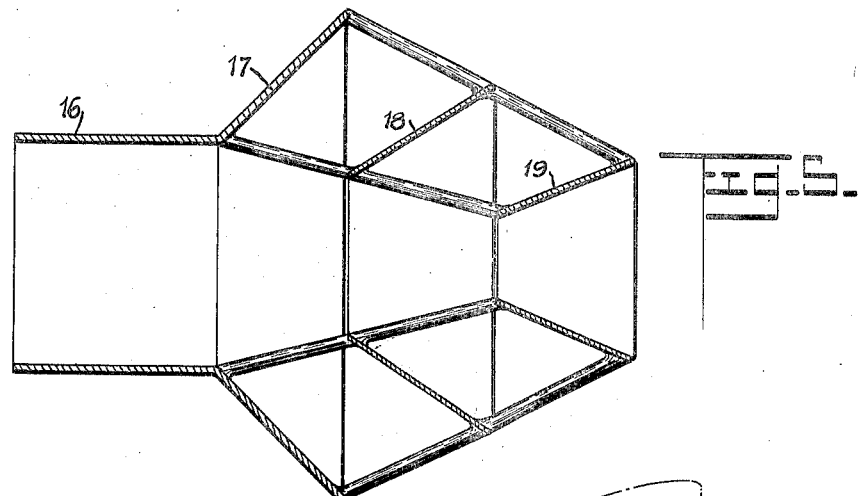
Figure 6:
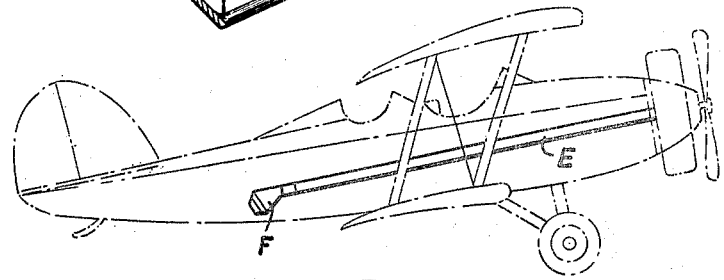
Figure 7:
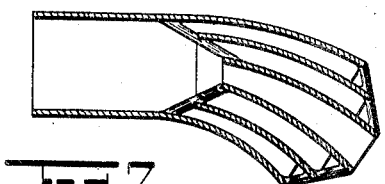

I will now in detail describe an embodiment of my invention as adapted for use in connection with the exhaust of an aircraft with reference to the annexed drawings, on which Fig. 1 is an end elevation of the device constructed in accordance with this invention, Fig. 2 a central section along line 2—2 in Fig. 1, Fig. 3 an elevation of the extinguisher, turned through a right angle from the position shown in Fig. 1 and seen from the rear, Fig. 4 a section along line 4—4 in Fig. 3;

Fig. 5 is a modification showing a different relative arrangement of the truncated hollow members. Fig. 6 shows the extinguisher in place at the end of the exhaust pipe on the side of an aircraft, while Fig. 7 shows a slightly modified shape of the extinguisher. Fig. 8 is another modification.

As shown on the drawings, the extinguisher comprises a cylindrical part 10 made to fit to the end of the exhaust pipe of an aircraft engine. To said cylindrical part are attached mutually spaced outwardly flaring truncated hollow members open at their ends. On the drawings are shown three members respectively designated 11, 12 and 13, which according to Figs. 2 and 4 are nested one within the other, being disposed in spaced relationship so as to provide a plurality of diverging gas passages between them. At their inlet ends, that is where they join the cylindrical part 10, the hollow members are connected by braces 14, while at their outlet ends they are connected by braces 15.

As shown in Fig. 3, at their inner ends, the hollow members are of circular cross-section, but they are deformed so that they are gradually flattened in cross-section toward their outer ends merging from the circular cross-section at their inner ends to an elliptical cross-section at their outer ends. The extinguisher is secured to the end of the exhaust pipe with the major axes of the ellipses vertical as shown in Fig. 1.

As will appear from Fig. 2, the divergence of the innermost hollow member and the two annular spaces surrounding said innermost member, taken in the plane of the major axes of the ellipses are 19° and 8½° respectively, while, as shown by Fig. 4, the corresponding divergences, taken in the plane of the minor axes of the members, are respectively 6°, 2½° and 2°.

In the embodiment shown, the ratio $$\frac{a}{b}$$

of the axes of the elliptical outlets for each hollow member words out at about 1.7, whereas the ratio $$\frac{l}{r},$$

wherein $l$ is the length of the flaring part of the extinguisher and $r$ the radius of the exhaust pipe, is about 3.5. These ratios, as I have found, are optimum values. If the length of the flaring part of the extinguisher is made less than 3.5 times the radius of the exhaust pipe, there is danger that the flames may not be properly extinguished, whereas, if the major axis of the elliptical outlet is increased beyond 1.7 times the minor axis, the flow of gases may become turbulent, because the gases then no longer follow the walls of the hollow members and the extinguishing effect consequently will be impaired.

A modification of the extinguisher is shown in Fig. 5, where the cylindrical part to be fitted to the end of the exhaust pipe is shown at 16, while the truncated hollow members, also three in number, are shown at 17, 18 and 19. In this case, however, the hollow members, instead of being nested one within the other as shown in Figs. 1–4, are disposed in front of one another, being braced at their inlet and outlet ends as shown, the first hollow member being connected directly to the cylindrical part 16. Also in this modification, the hollow members will be deferred so as to become gradually flattened in cross-section toward their outer ends.

Fig. 6 shows the arrangement of the flame-extinguisher indicated at F at the end of the exhaust pipe indicated at E on the side of an aircraft shown in outline. As will be seen from this figure, the extinguisher is so disposed as to be slightly downwardly inclined to direct the gases away from the chassis of the aircraft.

Instead of the device being attached as shown in Fig. 6, the walls of the hollow members constituting the extinguisher instead of being made straight, as shown in Figs. 2 and 4, may be given a curvature as indicated in Fig. 7 so that when the device is attached to the exhaust, it will either downwardly or outwardly project. The object of this arrangement is to deflect the gases away from the aircraft.

While I have shown on the drawings an extinguisher, having hollow members of circular and elliptical cross-section, it is understood, of course, that any desired cross-sections can be used, provided that the hollow members become gradually flattened toward their outer ends. Therefore, I do not limit myself to the constructions as shown, because they are readily susceptible of modifications and changes without a departure from the gist of the invention and depending on the purpose for which the extinguisher is used.

I claim:

1. In combination with a conduit for inflammable gases or flames, a flame extinguisher adapted to be connected to said conduit, and comprising a number of flaring truncated hollow members open at both ends, their smaller ends facing the inner end of the extinguisher, said members being disposed in spaced relationship to provide passages therebetween and being gradually flattened in cross-section toward the outer end of the extinguisher.

2. In combination with a conduit for inflammable gases or flames, a flame extinguisher adapted to be connected to said conduit and comprising a number of flaring truncated hollow members open at both ends, their smaller ends facing the inner end of the extinguisher, said members being disposed in spaced relationship to provide passages therebetween, and being gradually flattened in cross-section toward the outer end of the extinguisher so that they have a greater transverse dimension in one direction than in a right angular direction, the major transverse dimensions of said members at their outer ends being approximately 1.7 times their minor transverse dimensions.

3. In combination with a conduit for inflammable gases or flames, a flame extinguisher adapted to be connected to said conduit and comprising a number of flaring truncated hollow members open at both ends, their smaller ends facing the inner end of the extinguisher, said members being disposed in spaced relationship to provide passages therebetween, and being of substantially circular sectional shape at their inner ends and of substantially elliptical sectional shape at their outer ends.

4. In combination with a conduit for inflammable gases or flames, a flame extinguisher adapted to be connected to said conduit and comprising a number of flaring truncated hollow members open at both ends, their smaller ends facing the inner end of the extinguisher, said members being disposed in spaced relationship to provide passages therebetween and being of substantially circular sectional shape at their inner ends, the over all length of the members taken collectively being approximately three and one-half times the radius of the outermost member at its smaller end.

5. A flame extinguisher as set forth in claim 4 in which said hollow members are gradually flattened in cross-section toward their outer ends.

6. A flame extinguisher as specified in claim 1 in which said hollow members are disposed with their axes in substantially a common straight line.

7. A flame extinguisher as specified in claim 1 in which said hollow members are disposed in nested relationship.

8. A flame extinguisher as specified in claim 1 in which said hollow members are disposed substantially in front of one another.

9. A flame extinguisher as specified in claim 1 in which said hollow members are disposed in nested relationship with their axes in substantially a common straight line.

10. A flame extinguisher as specified in claim 1, in which said hollow members are disposed substantially in front of one another with their axes in substantially a straight line.

11. A flame extinguisher as specified in claim 1, in which the walls of said hollow members are given a one-sided inclined curvature.

12. A flame extinguisher as specified in claim 3, in which the walls of said hollow members are given a one-sided inclined curvilinear shape.

13. In combination with a conduit for inflammable gases or flames, a flame extinguisher adapted to be connected to said conduit and comprising a number of flaring truncated hollow members open at both ends, their smaller ends facing the inner end of the extinguisher, said members being disposed in spaced relationship to provide passages therebetween, a number being of oval cross-section at their inner ends gradually increasing in width toward the outer ends of said members.

FRANZ J. KURTH.